United States Patent
Gallet

(10) Patent No.: US 9,416,733 B2
(45) Date of Patent: Aug. 16, 2016

(54) SEALING DEVICE HAVING A SLEEVE FOR THE PASSAGE OF A CONNECTING ROD OF A SYSTEM FOR CONTROLLING THE ORIENTATION OF THE BLOWER BLADES OF A TURBOPROP ENGINE THROUGH A PARTITION

(75) Inventor: Francois Gallet, Paris (FR)

(73) Assignee: SNECMA, Paris (FR)

( * ) Notice: Subject to any disclaimer, the term of this patent is extended or adjusted under 35 U.S.C. 154(b) by 698 days.

(21) Appl. No.: 13/822,857

(22) PCT Filed: Sep. 12, 2011

(86) PCT No.: PCT/FR2011/052077
§ 371 (c)(1),
(2), (4) Date: Mar. 13, 2013

(87) PCT Pub. No.: WO2012/038638
PCT Pub. Date: Mar. 29, 2012

(65) Prior Publication Data
US 2013/0183143 A1    Jul. 18, 2013

(30) Foreign Application Priority Data

Sep. 20, 2010  (FR) ........................... 10 57496

(51) Int. Cl.
*F02C 7/28* (2006.01)
*F01D 7/00* (2006.01)
(Continued)

(52) U.S. Cl.
CPC .................. *F02C 7/28* (2013.01); *B64C 11/308* (2013.01); *F01D 7/00* (2013.01); *F01D 25/16* (2013.01); *F01D 25/183* (2013.01); *F02C 7/06* (2013.01);
(Continued)

(58) Field of Classification Search
CPC ..... B64C 11/308; F01D 25/16; F01D 25/183; F02C 7/28; F02C 7/06; F02K 3/072; F16J 15/52; F16J 3/047; B64D 2027/005; F05D 2220/324; F05D 2220/325; F05D 2240/55; F05D 2260/50; Y02T 50/66; Y02T 50/671
See application file for complete search history.

(56) References Cited

U.S. PATENT DOCUMENTS 4,657,484 A    4/1987  Wakeman et al.
4,913,623 A *  4/1990  Schilling ............... B64C 11/346
                                                    416/129

(Continued)

FOREIGN PATENT DOCUMENTS

EP    1 911 938    4/2008
FR    2 777 336    10/1999
GB    2 280 000    1/1995

OTHER PUBLICATIONS

International Search Report Issued Nov. 17, 2011 in PCT/FR11/52077 Filed Sep. 12, 2011.

*Primary Examiner* — Thomas Denion
*Assistant Examiner* — Brandon Lee
(74) *Attorney, Agent, or Firm* — Oblon, McClelland, Maier & Neustadt, L.L.P

(57) ABSTRACT

A sealing device for passing a connecting rod of a system for controlling a pitch of fan blades of a turboprop through a partition. The device includes a tube for fastening to the partition that is to be sealed, and a frustoconical sheath through which the connecting rod is to pass, the sheath configured to slide axially inside the tube and including, at its wider end, a sealing mechanism co-operating with the tube, and, at its narrower end, a leaktight fastener fastening to a corresponding end of the connecting rod.

6 Claims, 3 Drawing Sheets

(51) Int. Cl.
*F01D 25/16* (2006.01)
*F01D 25/18* (2006.01)
*F02C 7/06* (2006.01)
*F02K 3/072* (2006.01)
*F16J 3/04* (2006.01)
*F16J 15/52* (2006.01)
*B64C 11/30* (2006.01)
*B64D 27/00* (2006.01)

(52) U.S. Cl.
CPC ............... *F02K 3/072* (2013.01); *F16J 3/047* (2013.01); *F16J 15/52* (2013.01); *B64D 2027/005* (2013.01); *F05D 2220/324* (2013.01); *F05D 2220/325* (2013.01); *F05D 2240/55* (2013.01); *F05D 2260/50* (2013.01); *F05D 2260/79* (2013.01); *Y02T 50/66* (2013.01); *Y02T 50/671* (2013.01)

(56) References Cited

U.S. PATENT DOCUMENTS 5,353,489 A * 10/1994 Weaver .................. B25B 27/28
29/235
2008/0173114 A1 7/2008 Charier et al.

* cited by examiner

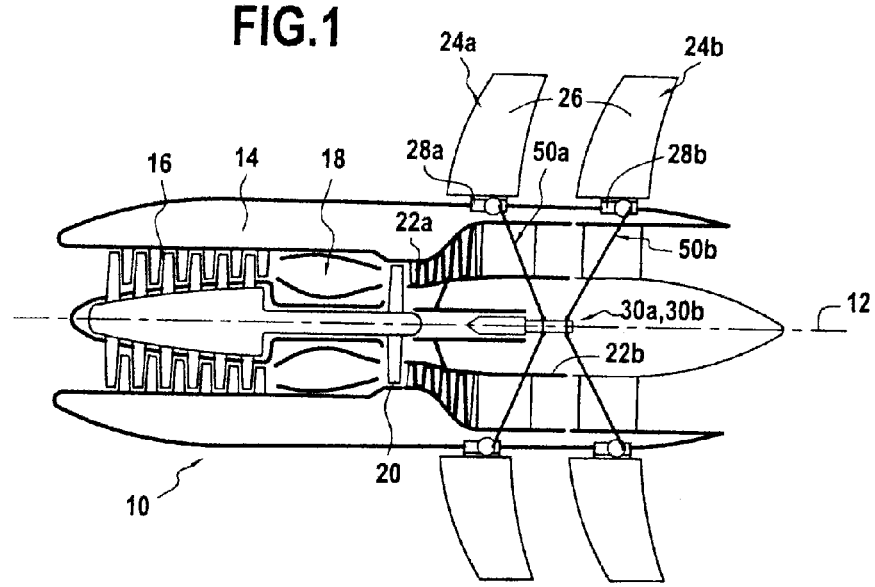
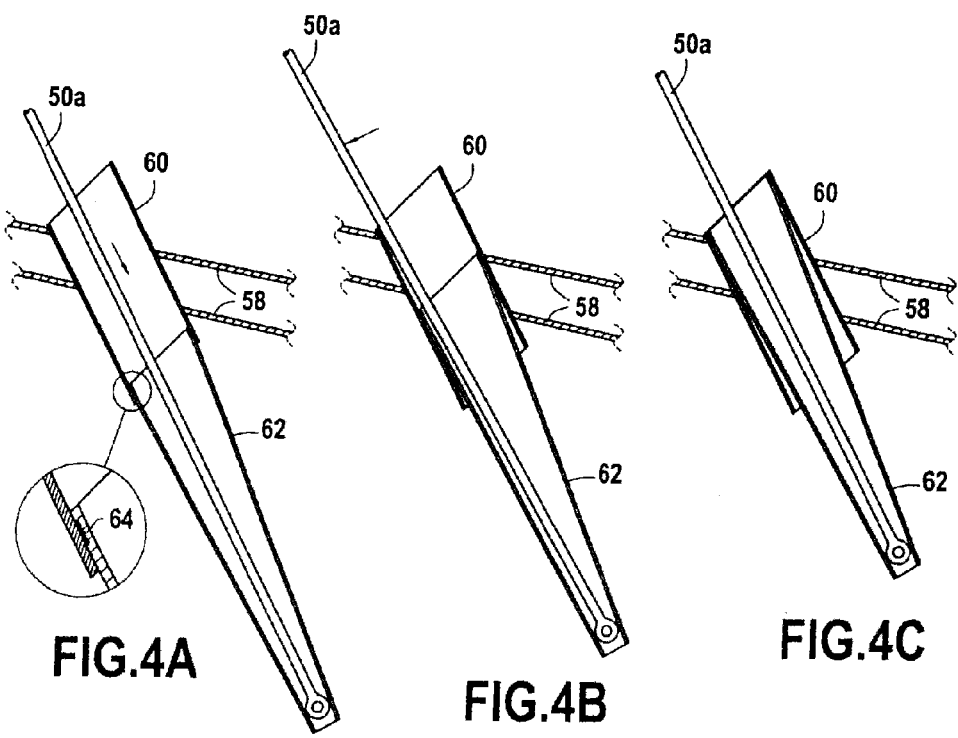

SEALING DEVICE HAVING A SLEEVE FOR THE PASSAGE OF A CONNECTING ROD OF A SYSTEM FOR CONTROLLING THE ORIENTATION OF THE BLOWER BLADES OF A TURBOPROP ENGINE THROUGH A PARTITION

BACKGROUND OF THE INVENTION

The present invention relates to the general field of controlling the pitch of fan blades of a turboprop.

A preferred field of application of the invention is that of airplane turboprops having two propellers.

An airplane turboprop having two propellers comprises a turbine with two contrarotating rotors, each driving a set of unducted fan blades. In this type of airplane engine, the pitch of the fan blades constitutes one of the parameters used for controlling the thrust from the engine.

French patent application No. 10/51458 filed on Mar. 1, 2010 by the Applicant describes a system for controlling the pitch of fan blades of such a turboprop. In that document, each blade is coupled, for adjusting its pitch, to a blade root support that is pivotally mounted on a rotary ring via bevel gearing, one of the gearwheels of the gearing being supported by the blade root support and the other gearwheel carrying a counterweight. An actuator centered on the axis of rotation of the rotary ring and constrained to rotate with the turbine rotor is connected to each counterweight via a radial connecting rod. By actuating the actuator, the connecting rods act on the counterweights on the principle of a crank shaft and a connecting rod so as to cause the blade root supports to pivot in synchronized manner.

Such a control system presents numerous advantages. In particular, it is reliable and light in weight since it possesses relatively few parts compared with prior art control systems.

The connecting rods of the system extend radially from the actuator to the blade root supports. As a result, some of those connecting rods need in particular to pass through an oil enclosure in which various rolling bearings of the turboprop are housed. This applies in particular for the connecting rods of the system for controlling the upstream set of blades.

Unfortunately, such oil enclosures rotate in operation, and as a result the oil that is present therein is subjected to centrifugal force. Consequently, in order to prevent any outward leakage of oil from the oil enclosure, it is necessary to seal the packages where the connecting rods of the control system pass through the partitions of the oil enclosure.

OBJECT AND SUMMARY OF THE INVENTION

A main object of the present invention is thus to satisfy this need by proposing a device that serves to seal the partition of the oil enclosure where the connecting rods of the control system pass therethrough.

According to the invention, this object is achieved by a sealing device comprising a tube for fastening to the partition that is to be sealed, and a frustoconical sheath through which the connecting rod is to pass, the sheath being capable of sliding axially inside the tube and having, at its wider end, sealing means co-operating with the tube, and, at its narrower end, leaktight fastener means for fastening to a corresponding end of the connecting rod.

The passage of the connecting rod through the partition is sealed by the presence of the sealing means between the wider end of the sheath and the tube. Furthermore, in operation, the connecting rod of the control system is subjected both to radial movements and to lateral movements. The frustoconical shape of the sheath thus enables it to avoid interfering with the lateral movements of the connecting rod. Furthermore, the axial sliding of the sheath inside the tube serves to compensate for the radial movements of the connecting rod.

As a result, the sealing device of the invention makes it possible to guarantee effective sealing of the oil enclosure in a turboprop without having to use a flexible part that could potentially give rise to problems of reliability and lifetime.

The sealing device of the invention also serves to decouple the "sealing" function from the "force transmission" function. The force transmission function is performed by the connecting rod, while the sealing function is provided by the sheath. Such decoupling makes it possible to limit the interference between the two functions and thus makes each of them easier to achieve. In particular, sealing at the wider end of the sheath is unaffected by any possible deformation of the connecting rod.

Finally, the sealing device serves to limit connecting rod buckling phenomena. The connecting rod may potentially buckle in the length direction, but not in the width direction since the sheath limits any buckling in that direction.

The wider end of the sheath may have a gasket at its periphery co-operating with the inside of the tube in order to provide sealing between the sheath and the tube.

The narrower end of the sheath may be closed and pivotally mounted about a pivot pin of the corresponding end of the connecting rod in order to fasten the sheath to the connecting rod in sealed manner.

The invention also provides a system for controlling the pitch of fan blades of a turboprop having at least one set of adjustable-pitch fan blades, said set being constrained to rotate with a rotary ring mechanically connected to a rotary casing, each blade of the set being coupled for adjusting its pitch to a blade root support pivotally mounted on the rotary ring by means of bevel gearing comprising a first toothed wheel secured to the blade root support and centered on an axis that is radial relative to the rotary ring, and a second toothed wheel secured to the rotary ring and centered on an axis that is tangential relative to said rotary ring, the second toothed wheel carrying a counterweight that is eccentric relative to its axis of rotation, the system further including an actuator centered on the axis of rotation of the rotary ring, constrained to rotate with the rotary casing, and having its rod connected to each counterweight by radial connecting rods and bellcranks, the system further comprising, for each radial connecting rod, a sealing device as defined above.

The invention also provides a turboprop having two propellers, including a turbine having two contrarotating rotary casings and two sets of adjustable-pitch fan blades constrained to rotate with two rotary rings respectively connected to the rotary casings, the pitch of the fan blades of at least one of the sets being controlled by a system as defined above.

BRIEF DESCRIPTION OF THE DRAWINGS

Other characteristics and advantages of the present invention appear from the following description made with reference to the accompanying drawings that have no limiting character. In the figures:

FIG. 1 is a diagrammatic longitudinal section view of a two-propeller turboprop having a propeller blade pitch control system to which the invention applies in particular;

FIGS. 4A to 4C show the FIG. 2 sealing device in various different positions.

DETAILED DESCRIPTION OF AN EMBODIMENT

Figure 2:
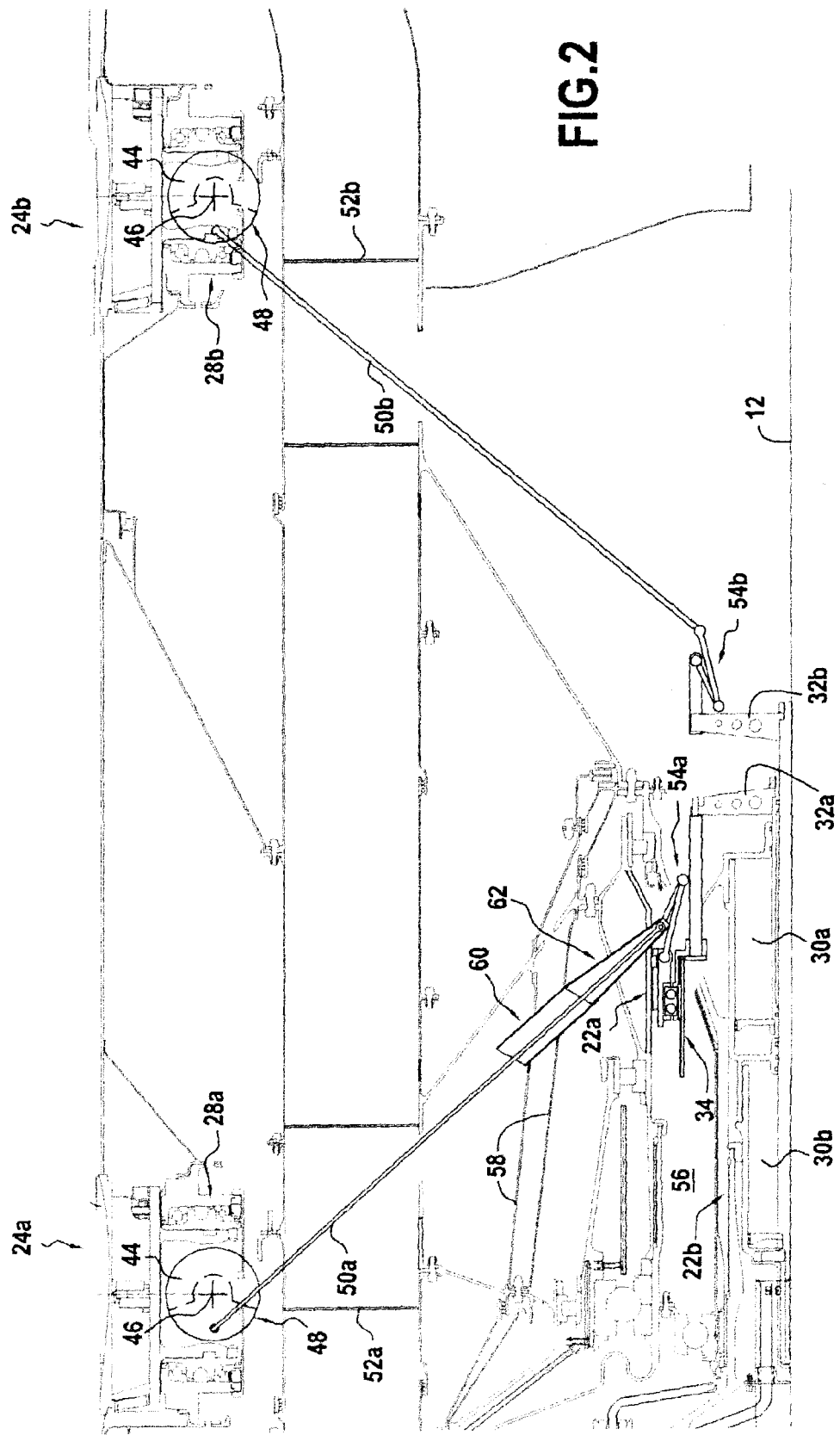
FIG. 2 is an enlarged view of FIG. 1 showing the location of the sealing device of the invention.

FIG. 1 is a highly diagrammatic view of an embodiment of an airplane turboprop 10 of the type having two propellers.

The turboprop 10 comprises in particular a longitudinal axis 12 and an annular nacelle 14 arranged axially around the longitudinal axis. From upstream to downstream it also comprises a compressor 16, a combustion chamber 18, and a "power" turbine 20 driving two rotary casings 22a and 22b in rotation (either directly or indirectly).

The turboprop 10 also has an upstream (or front) set 24a and a downstream (or rear) set 24b of adjustable-pitch fan blades 26. More particularly, the fan blades 26 in each set 24a, 24b are mounted on respective rotary rings 28a, 28b in the form of annular platforms centered on the longitudinal axis 12 of the turboprop.

Each rotary casing 22a, 22b carries and drives in rotation a respective one of the rotary rings 28a, 28b having one of the sets 24a, 24b of adjustable-pitch fan blades mounted thereon.

The turboprop 10 also has a system for controlling the pitch of the fan blades in the upstream and downstream sets 24a and 24b. The control system is described in French patent application No. 10/51458 filed on Mar. 1, 2010 by the Applicant, and the content thereof is incorporated herein by reference.

As shown in FIG. 2, the control system has two cylindrical actuators 30a, 30b actuating mechanisms for changing the pitch of the fan blades in the upstream and downstream sets, these mechanisms being made up in particular of connecting rods that are described below.

The actuators 30a, 30b are in alignment on the longitudinal axis 12 with coaxial rods 32a, 32b, and they are constrained to rotate with a shaft of the rotary casing 22b that drives the downstream set 24b in rotation.

The respective rods 32a, 32b of these two actuators move in translation along the longitudinal axis 12, with the outer rod 32a of the actuator 30a serving to adjust the pitch of the fan blades of the upstream set 24a and the inner rod 32b of the actuator 30b serving to adjust the pitch of the fan blades of the downstream set 24b.

A rolling bearing 34 is mounted between the outer rod 32a of the actuator 30a and the mechanism for changing the pitch of the fan blades of the upstream set in order to transmit axial forces from the outer rod to the mechanism while leaving these two entities free to rotate in opposite directions.

Figure 3A:
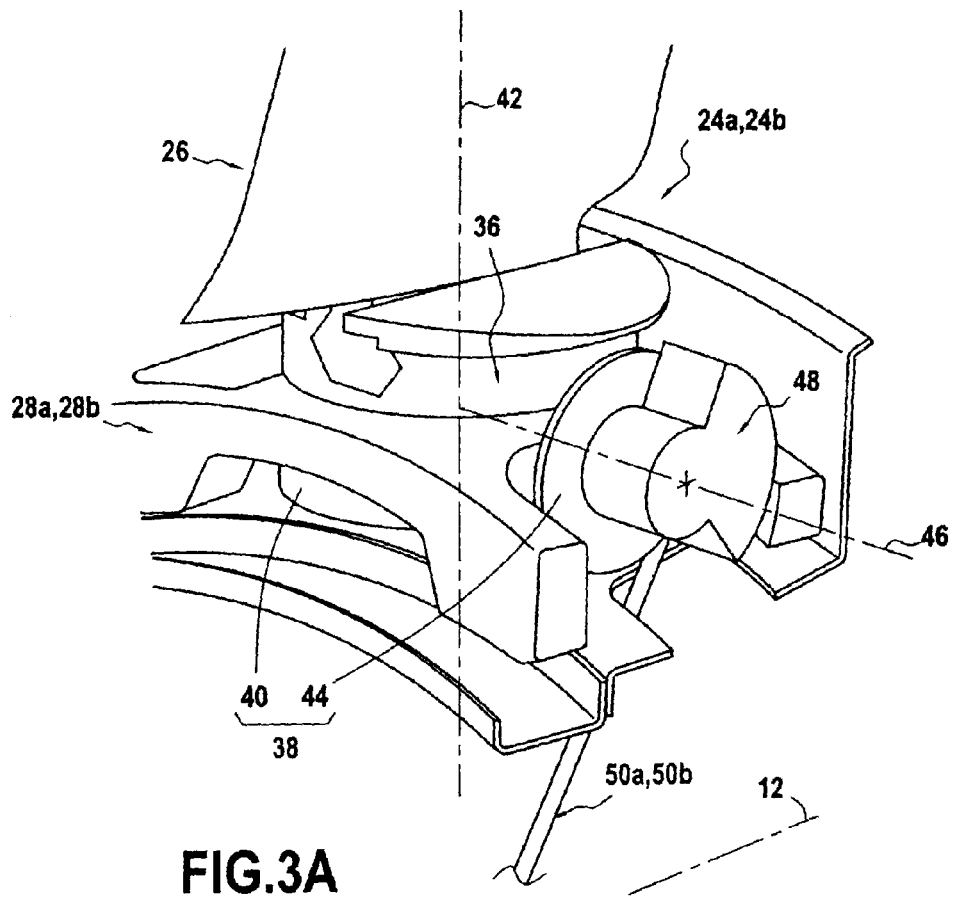
FIGS. 3A and 3B are diagrams showing the movements of the control system of FIGS. 1 and 2.
Figure 3B:
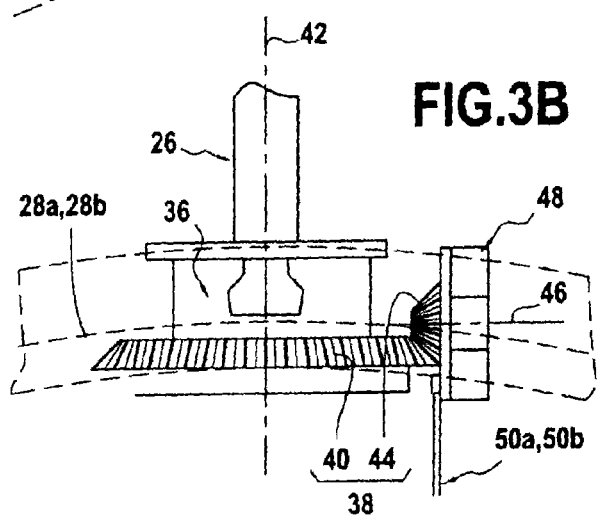

Furthermore, as shown in FIGS. 3A and 3B, each blade 26 in the sets 24a, 24b is coupled to a blade root support 36 that is pivotally mounted on the rotary ring 28a, 28b by means of bevel gearing 38. This bevel gearing is constituted by a first toothed wheel 40 secured to the blade root support and centered on an axis 42 that is radial relative to the rotary ring, and a second toothed wheel 44 that is secured to the rotary ring and that is centered on an axis 46 that is tangential relative to the rotary ring.

The number of teeth in the first toothed wheel 40 is selected to be equal to substantially twice the number of teeth on the second toothed wheel 44. Thus, turning the second toothed wheel through 90° will cause the first toothed wheel to turn through about 45°.

In the bevel gearing, each second toothed wheel 44 carries a counterweight 48 that is off-center relative to the axis of rotation 46 of the wheel. The mass of the counterweight is predefined in particular as a function of the characteristics of the fan blades.

Each mechanism for changing the pitch of the fan blades also includes a plurality of connection arms connecting the rod 32a, 32b of the corresponding actuator 30a, 30b to the counterweights 48 of the corresponding set of fan blades.

The function of these connection arms is to convert the axial movement of the actuator rod into synchronized rotation of the counterweights of the corresponding set of fan blades about their respective pitch axes 46.

For this purpose, each connection arm comprises in particular a radial connecting rod 50a, 50b passing through a casing arm 52a, 52b of the turboprop and having one end connected to the corresponding counterweight and the other end connected to one branch of a bellcrank 54a, 54b having its other branch connected to the rod 32a, 32b of the corresponding actuator.

Each connection arm also has a guide connecting rod (not shown in the figures) with one end connected to the connection between the two branches of the bellcrank and with its other end acting as a guide support for the radial connecting rod.

In association with the actuators 30a, 30b, the turboprop 10 also has an oil enclosure 56 having arranged therein the various rolling bearings that provide the rotor shafts with rotary support (and in particular the rolling bearing 34).

This oil enclosure (which is subjected to the effects of centrifugal force due to the rotation of the rotors) is centered on the longitudinal axis 12 of the turboprop and is defined radially on the outside by an annular partition 58 secured to the rotor driving the upstream set 24a.

This partition 58 comprises a double wall, and the radial connecting rods 58a of the mechanism for changing the pitch of the fan blades of the upstream set pass therethrough.

In order to avoid any leak of oil from the oil enclosure 56, it is necessary to provide sealing where the radial connecting rods 50a pass through the partition 58.

For this purpose, the invention provides for each radial connecting rod to be associated with a sealing device that comprises in particular a hollow tube 60 of oblong or annular shape passing right through the partition 58 that is to be sealed and fastened thereto (e.g. by welding or by screw-fastening if the tube is made of metal).

The sealing device also has a frustoconical sheath 62 capable of sliding axially inside the tube 60, this sheath being mounted around the radial connecting rod 50a. More precisely, the narrower end of the sheath is fastened in leaktight manner to the end of the radial connecting rod that is connected to the bellcrank (this end is also referred to as the root of the radial connecting rod).

Going from this narrower end, the shape of the sheath flares to its wider end that is provided with means for sealing with the tube. For example, the wider end of the sheath includes an oblong or annular gasket 64 at its periphery that co-operates with the inside of the tube in order to provide sealing between the sheath and the tube (see FIG. 4A).

As a result, the sealing device of the invention makes it possible to guarantee effective sealing of the oil enclosure 56 that is defined radially on the outside by the partition 58.

In operation, the radial connecting rod 50a of the control system is subjected both to radial movements (i.e. parallel to its own axis) and to lateral movements. As shown in FIG. 4B, the frustoconical shape of the sheath 62 enables it to avoid interfering with the lateral movements of the connecting rod. As for the radial movements of the connecting rod, they are absorbed by the sheath sliding inside the tube 60 that is fastened to the partition 58 for sealing (see FIGS. 4A and 4C).

Figure 5:
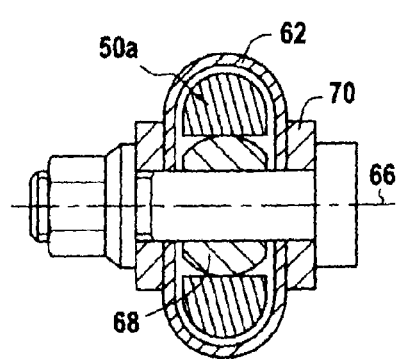
FIG. 5 shows more precisely the sealed fastening of the sheath of the sealing device of the invention on the end of the connecting rod.

It should be observed that the narrower end of the sheath 62 is closed and pivotally mounted about a pivot pin 66 of the root of the radial connecting rod 50a. More precisely, as shown in FIG. 5, the root of the radial connecting rod is mounted on a ball joint 68 that has the pin of a clevis 70 passing therethrough. This ball joint and also the root of the radial connecting rod are housed in the sheath 62 which is closed at this end. Thus, the oil contained in the oil enclosure cannot escape via this narrower end of the sheath.

The invention claimed is:

1. A sealing device for passing a connecting rod of a system for controlling pitch of fan blades of a turboprop through a partition, comprising:
   a tube fastened to the partition that is to be sealed; and
   a frustoconical sheath through which the connecting rod passes,
   wherein the sheath slides axially inside the tube,
   wherein a first end of the sheath includes a sealing element cooperating with the tube to provide sealing between the sheath and the tube, and
   wherein a second end of the sheath is closed and pivotally mounted about a pivot pin of a corresponding end of the connecting rod to fasten the sheath to the connecting rod in a sealed manner, the second end of the sheath being narrower than the first end of the sheath,
   wherein the second end of the corresponding end of the connecting rod is mounted on a ball joint through which a pin of a clevis passes therethrough, and the ball joint and the corresponding end of the connecting rod are housed in the second end of the sheath which is closed.

2. A device according to claim 1, wherein the sealing element includes a gasket at a periphery of the first end of the sheath co-operating with an inside of the tube to provide sealing between the sheath and the tube.

3. A system for controlling pitch of fan blades of a turboprop comprising:
   at least one set of adjustable-pitch fan blades, the set of fan blades are constrained to rotate with a rotary ring mechanically connected to a rotary casing, each blade of the set being coupled for adjusting a pitch thereof to a blade root support pivotally mounted on the rotary ring by a bevel gearing including a first toothed wheel secured to the blade root support and centered on an axis that is radial relative to the rotary ring, and a second toothed wheel secured to the rotary ring and centered on an axis that is tangential relative to the rotary ring, the second toothed wheel carrying a counterweight that is eccentric relative to an axis of rotation of the second toothed wheel;
   an actuator centered on an axis of rotation of the rotary ring, constrained to rotate with the rotary casing, and including a rod connected to each counterweight by radial connecting rods and bellcranks; and
   a sealing device for passing each connecting rod through a partition,
   wherein each sealing device comprises:
      a tube fastened to the partition that is to be sealed; and
      a frustoconical sheath through which the connecting rod passes,
      wherein the sheath slides axially inside the tube,
      wherein a first end of the sheath includes sealing element co-operating with the tube to provide sealing between the sheath and the tube,
      wherein a second end of the sheath is closed and pivotally mounted about a pivot pin of a corresponding end of the connecting rod to fasten the sheath to the connecting rod in a sealed manner, the second end of the sheath being narrower than the first end of the sheath, and
      wherein the second end of the corresponding end of the connecting rod is mounted on a ball joint through which a in of a clevis passes therethrough, and the ball joint and the corresponding end of the connecting rod are housed in the second end of the sheath which is closed.

4. A turboprop comprising:
   two propellers, including a turbine including two contrarotating rotary casings and two sets of adjustable-pitch fan blades constrained to rotate with two rotary rings respectively connected to the rotary casings,
   wherein a pitch of the fan blades of at least one of the sets is controlled by a system according to claim 3.

5. The sealing device as claimed in claim 1, wherein the partition is secured to a rotor driving fan blades, and the partition defines a radially outer periphery of an oil enclosure.

6. The system as claimed in claim 3, wherein the partition is secured to a rotor driving the fan blades, and the partition defines a radially outer periphery of an oil enclosure.

* * * * *